United States Patent [19]
McArthur

[11] 3,895,527
[45] July 22, 1975

[54] METHOD AND APPARATUS FOR MEASURING PRESSURE RELATED PARAMETERS IN A BOREHOLE

[75] Inventor: Billy W. McArthur, Houston, Tex.

[73] Assignee: Sperry-Sun Well Surveying Company, Sugar Land, Tex.

[22] Filed: Nov. 8, 1973

[21] Appl. No.: 414,060

[52] U.S. Cl.................................. 73/151; 73/388 R
[51] Int. Cl............................................ E21b 47/06
[58] Field of Search.......... 73/151, 388 R, 299, 300, 73/301, 302

[56] References Cited
UNITED STATES PATENTS

| | | | |
|---|---|---|---|
| 804,570 | 11/1905 | Wheeler | 73/300 |
| 2,106,996 | 2/1938 | Edwards | 138/89 |
| 3,712,129 | 1/1973 | Rhoades | 73/151 |

*Primary Examiner*—Jerry W. Myracle
*Attorney, Agent, or Firm*—George L. Church; Donald R. Johnson; John E. Holder

[57] ABSTRACT

A system for remotely measuring pressure in a borehole includes a probe for placement in the borehole. A pressure measuring device for detecting pressure variations is connected to the probe by means of a tube. A fluid is passed through the tube into the probe which in turn is exposed to borehole pressure and by detecting predictable variations in pressure build-up in the tube, pressure parameters in the borehole can be determined. The system may then be used to detect variations in pressure parameters.

7 Claims, 4 Drawing Figures

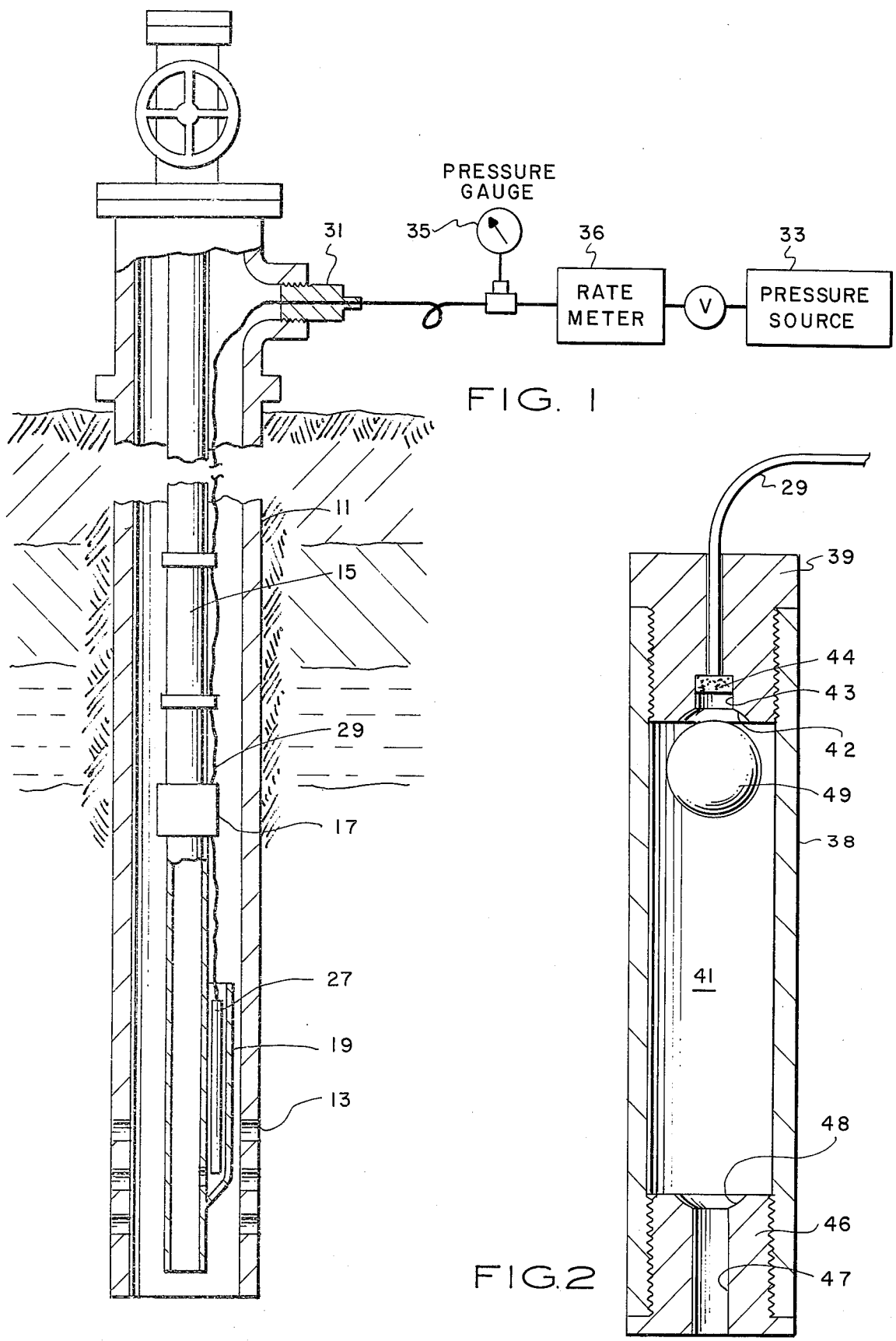

METHOD AND APPARATUS FOR MEASURING PRESSURE RELATED PARAMETERS IN A BOREHOLE

BACKGROUND OF THE INVENTION

There are many instances of situations where it is desirable to measure changes in pressure in the relatively inaccessible environment of a borehole. One of the most obvious and also most important applications for such devices is in wells producing a fluid from underground formations, where formation pressure is a factor in such production. In particular, application is found in oil and gas producing wells.

In the analysis of most production and reservoir engineering problems, reliable reservoir pressure data together with other basic production and geological data is essential. In recent years, the oil industry has through extensive research efforts developed many methods and techniques for utilizing pressure data in evaluating problems of petroleum production. For example, reliable bottom hole pressure information is essential to implement and maintain secondary recovery operations. In such operations, periodic pressure observations are used to determine fill up requirements, location of flood fronts, sweep efficiencies, well productivity potential, etc. In addition, bottom hole pressure measurements are used to determine the occurrence of wellbore damage and operational problems in pumping wells. In any event, there are many applications for the use of pressure data in efficiently producing petroleum reservoirs.

In petroleum production operations bottom hole pressure data may be provided on a permanent basis or may be determined over short periods of time by running in pressure instruments periodically. Often times, it is inconvenient and very expensive to take such data on a periodic basis, since normally the well must be shut in or producing equipment must be removed to facilitate the running in of instrumentation for taking pressure data. In order to overcome these problems permanent pressure measuring devices have been devised for installation in producing wells. One such device operates with a downhole pressure transducer having an electronic scanning system for converting the downhole pressure into data transmittable to the surface by means of a conductor cable. The cable is normally applied or attached to the outside of the tubing with the transducer being mounted on the lower end of the tubing string. The electronics in such a system are expensive and produce maintenance problems. In addition, an electronic system using scanners and transmitting such data over conductors is subject to problems of maintaining a high resolution and thus data may not be as accurate as that needed to determine changes in reservoir conditions. Also, conductor cable deteriorates with time and is often subject to chemical reaction with wellbore fluids. Another problem is the temperature limitations of electronic instrumentation which are sometimes exceeded in deep or high temperature wells.

Downhole pressure transducers are often intricate in design and of course are subject to the hostile pressure, temperature and chemical fluids environment of wellbores. Thus, simplicity of design is an important factor in the efficient and lasting operation of pressure measuring devices.

It is therefore an object of the present invention to provide a new and improved apparatus for detecting borehole pressure.

SUMMARY OF THE INVENTION

With these and other objects in view, the present invention contemplates a pressure measuring system having a tube extending from the surface into a borehole and open at its lower end to fluids in the borehole. At the surface, fluid is passed into the tube and by monitoring the rate of pressure-build-up of the fluid, pressure parameters at the borehole location may be determined.

BRIEF DESCRIPTION OF THE DRAWINGS

FIG. 1 is a schematic drawing of a wellbore and production equipment including a pressure measuring system in accordance with the present invention;

FIG. 2 shows a downhole pressure probe for use in the system;

DESCRIPTION OF THE PREFERRED EMBODIMENTS

Figure 3:
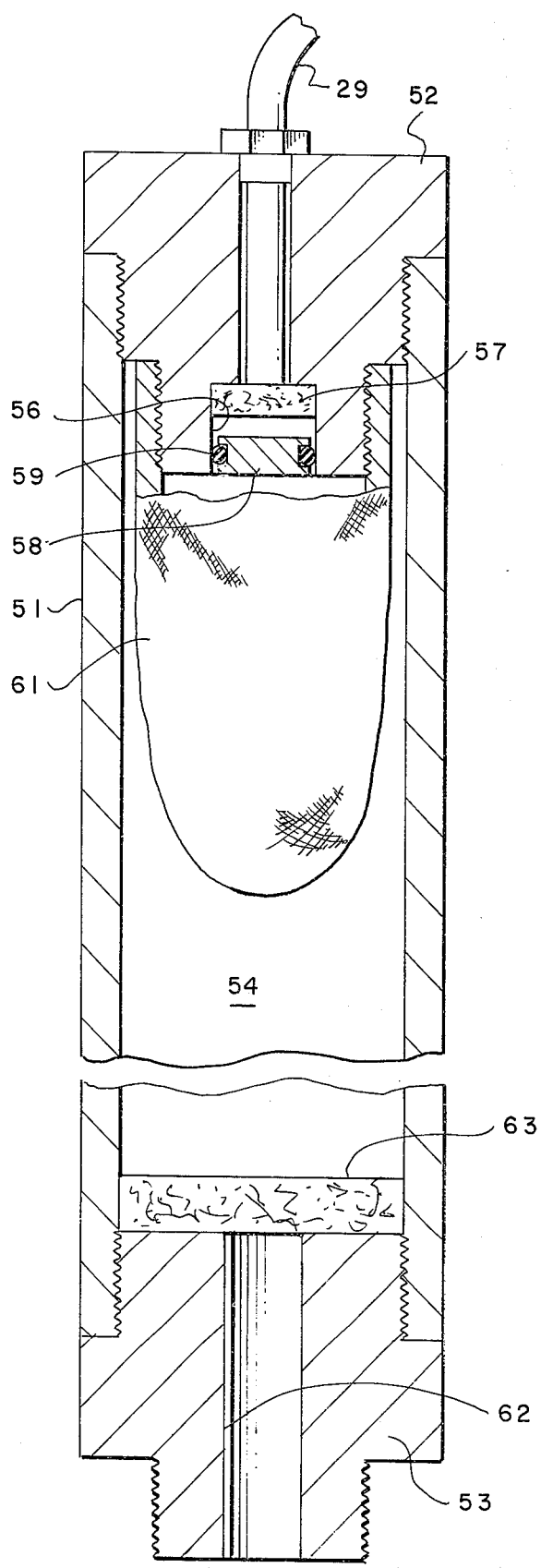
FIG. 3 is an alternative embodiment of a downhole pressure probe.

Referring first to FIG. 1 of the drawings a wellbore is shown extending into underground formations. Production equipment for producing fluids from the formation is shown schematically and includes a casing 11 in the wellbore having perforations 13 at its lower end to permit the entry of formation fluids. A tubing string 15 extends from the well head at the surface downwardly within the borehole to the lower end thereof. Spacers 17 are provided in the tubing string to maintain the tubing centered in the wellbore. A mandrel 10 is shown attached to lower end of the tubing to provide a seat for a downhole pressure probe 27. The mandrel is open to permit the entry of wellbore fluids. The downhole pressure measuring probe 27 is shown positioned in the mandrel at the lower end of the tubing. A small diameter hollow tube 29 extends from within the pressure measuring probe. The tube is positioned on the outside of the tubing string and extends to the surface where it exits from the side of the wellhead through a fitting 31. Connected to the tube 29 at the surface is a fluid pressure source 33 and a pressure indicating device 35. A rate meter 36 is shown in the system to measure the rate of pressure change when pressure is applied to the system. The rate may be determined by any sort of device that detects pressure as a function of time. Thus as pressure is charted versus time or printed out in a timed sequence, this will serve to establish the rate of pressure change.

One embodiment of the downhole probe 27 is shown in greater detail in FIG. 2 of the drawings. The probe includes a housing 38 having a plug 39, closing its upper end. The tube 29 extends through the plug 39 into communication with a chamber 41 within the housing. The bottom surface of the plug 39 has a concave surface 42 with a recess 43 centered therein. A metallic screen 44 is positioned in the recess where it connects with the tube 29. At the lower end of housing 38 is another plug 46 which has a central opening 47 to permit the entry of borehole fluids into chamber 41.

An upwardly facing concave surface 48 is formed on top of plug 46. The concave surfaces 42 and 48 are shaped to sealingly mate with the surface of a ball 49 positioned within chamber 41. The ball 49 is made so that it is less dense than the borehole fluids, thus, as borehole fluids enter the chamber 41, the ball engages surface 42 on plug 39 and closes the recess 43. This in turn prevents the entry of borehole fluids into tube 29 during the running in procedure and thus keeps particles which may be in such fluids from clogging the tube 29. The screen 44 also acts to filter out any such particles.

The installation of the apparatus thus far described is accomplished as follows. The tubing 15 is withdrawn from the borehole and the probe 27 is positioned within mandrel 19 attached to the lower section of tubing. The tube 29 is then attached to the probe and positioned on the outside of the tubing as it is fed into the borehole from the surface. The tube 29 may be fixed to the outside of the tubing as by clamping, banding, etc. The procedure is continued until the tubing extends into the borehole to the desired depth. The upper end of the casing 11 is shut in at the well head and the system is ready for operation. During the running of the tube 29, fluid density in the wellbore is sufficient to float the ball 49 into engagement with surface 42 to seal off the tube from the entry of borehole fluids. The differential pressure between the borehole environment and surface pressure in the tube thereafter maintains the ball in its seated position.

In the operation of the apparatus thus far described, pressure is first applied to the upper end of the tube as at 33 and is increased at a substantially constant rate. This is continued until the ball 49 moves away from the surface 42 at which time the pressure in the tube exceeds pressure in the borehole and the fluid in the tube begins to displace the fluid in chamber 41.

Figure 4:
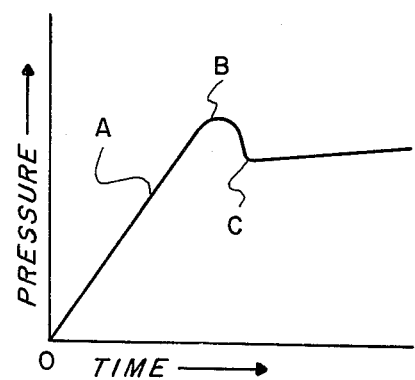
FIG. 4 is a graphical representation of how indications of pressure changes at the surface may be used to determine downhole pressure parameters.

Referring now to FIG. 4, observation of the rate of pressure increase will show a fairly constant rate of increase (Point A) until this point of excess pressure in the tube (Point B) has been reached assuming the pressure has been applied to the tube at a fairly constant rate. When the ball is unseated, the pressure in the tube equalizes with the bottom hole pressure (Point C). However, when bottom hole pressure is reached the pressure will increase only very slightly (almost imperceptibly). The application of further pressure to the tube is then ceased and the system is locked in at this pressure. Thereafter any changes in downhole pressure will cause a proportionate pressure change at the surface which is detected at pressure gauge 35. Sufficient pressure over and above downhole pressure is preferably applied to the system before the pressure is locked in to provide a range of pressure increase so that the ball 49 will not be seated to close off passageway 29 and thus prevent further pressure increases from being transmitted to the surface. Likewise the lock in pressure should be adjusted to prevent the ball from closing off the lower opening 47 when formation pressure drops. The pressure should be locked in at a point where a suspected pressure range can be measured without the system closing off.

It should be pointed out that the use of a check valve device as shown in FIG. 2 for preventing the entry of well fluids into tube 29 may be eliminated from the system. For example, fluids may be clean enough to obviate the need for such precaution. In addition, screens may be used to prevent larger particles from entering the tube. In such event the procedure outlined above for operating the system would be the same, i.e., the rate of pressure change would behave in substantially the same manner except that the tube pressure would not exceed the downhole pressure to open the valve and the slope of the curve would change from A to C. The simplicity of this system makes it desirable over the alternative embodiments.

An alternative downhole probe is shown in FIG. 3 and includes a housing 51 having upper and lower plugs 52, 53 respectively, enclosing the housing to form a chamber 54. The tube 29 passes through an opening in the upper housing 52 and communicates with a recess 56 in the lower face of plug 52. A screen 57 which acts as a small pore filter is positioned in the top of recess 56 to filter fluids entering tube 29. A pump out protection plug 58 is also positioned in the recess 56 and has an O-ring seal 59 about its outer surface to form a seal with the side walls of the recess. A metal screen 61 which serves as a medium pore filter is attached to the bottom of plug 52 to provide a further filtering of fluids entering the tube 29 when pump out plug 58 is not in recess 56. The bottom plug 43 has a vertical opening 52 to provide for the communication of borehole fluids with chamber 54 and tube 29. Another screen 63 is placed over the opening 62 to provide a large pore filter.

In the operation of the apparatus shown in FIG. 3, the probe housing 51 is placed on well tubing as shown in FIG. 1 for insertion into the borehole or may be run into the borehole on a line or suspended from the tube 29 and lowered into the borehole. In any event as the probe is run into the borehole, fluid pressure in the line is lower than borehole fluid pressure and thus the plug 58 remains positioned in recess 56 to prevent the entry of borehole fluids into the tube 29. When the probe has reached its desired position in the borehole pressure is applied to tube 29 as from the source 33 until pressure in the tube exceeds the fluid pressure in the hole. At this point (Point B, FIG. 4) the plug 58 will be ejected from recess 56 and fluids pressure in the tube 29 and in the chamber 54 will be equalized. This pressure is then read at the surface and thereafter any variations in downhole fluid pressure may be read on gauge 35 at the surface except that a correction factor dealing with density of the fluid in the system must be used to correct the pressure read on gauge 35 to obtain true bottom hole pressure. This correction dealing with fluid density must be used with all embodiments of the system as described herein.

While particular embodiments of the present invention have been shown and described, it is apparent that changes and modifications may be made without departing from this invention in its broad aspects and therefore the aim in the appended claims is to cover all such changes and modifications as fall within the true spirit and scope of this invention.

What is claimed is:

1. A system for detecting downhole pressure of formation fluids in a petroleum reservoir and for providing readings at the surface of such pressure, including a well pipe extending from the surface into the petroleum reservoir; a small diameter hollow tube attached to the outside of said pipe and extending from the surface to the bottom of the pipe; a check valve at the lower end of said tube, said check valve comprising a ball floatable in formation fluids, upper seating means to restrict upward movement of the ball, and lower seating means to restrict downward movement of said ball; surface means for applying fluid pressure to the upper end of the tube; and means at the surface for detecting the rate of change of fluid pressure in the tube as pressure is applied to the surface.

2. In a system for measuring downhole pressure related parameters in a borehole having a string of pipe extending from the surface into the borehole; small diameter tubing means extending from the surface into the borehole and arranged for attachment to said string of pipe, means at the surface for applying fluid pressure to the surface end of the tubing means, first closure means at the downhole end of the tubing means for preventing the passage of borehole fluids into said tubing means when said tubing means is being run into the borehole, second closure means on said downhole end for preventing the passage of surface applied fluid into the borehole, and means at the surface end of the tubing means for measuring the presence of fluids in the tubing means.

3. The apparatus of claim 2 wherein said first and second closure means is a check valve comprising a ball floatable in formation fluids, a first valve seat receptive of the ball to restrain upward movement of said ball, and a second valve seat receptive of said ball to restrain downward movement of said ball.

4. A method for determining downhole pressure related parameters in a wellbore including the steps of: running a tube from the earth's surface into the wellbore so that the upper end of the tube is at the surface and the lower end of the tube is in communication with wellbore fluids, the pressure of which is to be measured; passing a fluid into the surface end of the tube at a substantially constant rate; detecting a rate of change of pressure increase in the tube as fluid is being passed into the tube at the surface; when a substantial decrease takes place in the rate of change of pressure as fluid is being passed into the tube at the surface, ceasing the passing of fluid into the tube and closing the tube at the surface to further fluid passage; and thereafter detecting changes in the pressure of the fluid in the tube.

5. The method of claim 4 and further including: closing the lower end of the tube as such tube is being run into the wellbore, and thereafter opening the lower end of the tube by the application of fluid pressure to the upper end of the tube.

6. The method of claim 4 and further including after detecting a decrease in the rate of pressure change in the tube as fluid is being passed into the surface end of the tube, continuing for a short time the passing of fluid into the surface end of the tube and then closing the surface end of the tube to further fluid passage.

7. The method of claim 6 wherein a chamber is placed on the lower end of the tube, such chamber having a valve therein which opens where fluid pressure in the tube exceeds downhole pressure and further including opening the valve by the passing of fluid into the tube until the decrease in the rate of change of pressure in the tube is detected.

* * * * *